Dec. 18, 1956 C. HALL 2,774,297
OIL SEPARATING, CITRUS JUICE RECEIVING PAN ADAPTED
FOR COOPERATION WITH A CITRUS JUICE EXTRACTOR
Filed Oct. 3, 1950

INVENTOR
Charles Hall
BY R. W. Hodgson
AGENT

United States Patent Office 2,774,297
Patented Dec. 18, 1956

2,774,297

OIL SEPARATING, CITRUS JUICE RECEIVING PAN ADAPTED FOR COOPERATION WITH A CITRUS JUICE EXTRACTOR

Charles Hall, Los Angeles, Calif.

Application October 3, 1950, Serial No. 188,154

2 Claims. (Cl. 100—105)

Generally speaking, the present invention relates to the juice extraction art and more particularly to a novel receiving pan adapted for cooperation with a juice extraction machine (preferably, though not necessarily, a citrus fruit juice extraction machine) in a manner whereby juice having in excess of a predetermined percentage of undesirable components (such as citrus fruit peeling oils and the like) therein will be separately received and isolated from the remainder of the juice having less than a predetermined percentage of undesirable components (such as citrus fruit peeling oils, and the like) therein, whereby the juice having less than the predetermined percentage of undesirable components can be employed for selected high quality uses (such as the preparation of frozen, bottled, canned or otherwise preserved citrus juices and the like). The less desirable juice containing in excess of a predetermined percentage of undesirable components (such as citrus fruit peeling oil and the like) can be employed for other uses requiring somewhat lower standards of purity (such as in the preparation of what are known in the art as "soft drinks" and the like. Or, if desired, it can be selectively, fractionally distilled so as to obtain various oils and essences employed in the pharmaceutical, flavoring and/or perfume arts. Or this juice may be employed in the manufacture of a number of other by-products.

It should be noted that the present invention is described herein in a form adapted for cooperation with a particular type of prior art citrus fruit juice extractor including two adjacent drums rotatably carried by supporting means in virtually parallel, laterally spaced positions, and including driven saw means adapted to slice each of a plurality of citrus fruits and feed the sliced portions thereof between the adjacent driven drums (whereby the fruit portions will be brought into forcible juice expressing contact with a spirally inwardly curved apertured pressure plate or grid underlying one of said drums in a juice expressing region, whereby the citrus juice will be expressed from the severed fruit portions.

A disadvantage of some prior art techniques is the admixture of an excessive amount of the peel oil with the fruit juice. Some of the prior art devices utilize specific gravity separators (i. e., centrifugal separators) or fractional distillation apparatus to effect separation of these two components. These separation techniques risk inefficiency and/or require elaborate or complex apparatus.

My invention arises largely from my discovery that the citrus fruit juice peeling oil is extracted or expressed primarily in certain zones, while the high standard, relatively oil free, citrus fruit juice is extracted or expressed in another region. Pursuant to this discovery, I have invented the hereinbelow described receiving pan for the purpose of separately receiving the relatively oily citrus fruit juice and the relatively oil free citrus fruit juice, thus completely eliminating the necessity for subsequent separating means of any type whatsoever.

Generally speaking, the present invention includes, in combination with a fruit juice extractor, divided, compartmentalized receiving pan means adapted to be arranged in receiving position below the juice expressing region thereof with at least one compartment being positioned with respect to the region (or regions) where the juice extraction machine damages the fruit peeling so as to receive virtually all of the juice containing in excess of a preselected percentage of undesirable peeling components (such as oils and the like). At least one compartment of the receiving pan means being so positioned with respect to the juice extraction or expressing region and the region (or regions) where the juice extraction machine damages the fruit peeling, as to receive virtually all of the expressed citrus juice having less than a preselected percentage of undesirable peeling components (such as oils or the like) therein.

In one general form of the present invention, the compartmentalized receiving pan means takes the form of a three division, three compartment receiving pan means so arranged that a first one of said compartments is positioned to receive virtually all of the fruit peeling oil produced as a result of the severing and impaling thereof, and so arranged that a second one of said compartments is positioned to receive expressed fruit juice having less than a preselected percentage of peeling oils and liquids therein, and so arranged that a third one of said compartments is positioned as to receive fruit peeling oils and liquids expressed from the fruit peeling in the region of greatest compression, tearing and damage thereto by the juice extraction machine.

In one preferred general form of the present invention, the first and third relatively oily juice receiving compartments are provided with connected outlet conduit means adapted to drain off the oily juice, and the middle compartment is provided with separate outlet conduit means adapted to drain off the relatively oil free, high standard fruit juice.

Also, generally speaking, the receiving compartments of the receiving pan may be provided with receiving surfaces of a material virtually impervious (or resistant) to attack by fruit acids or other constituents of the fruit juice.

It will be understood from the above general description of the present invention that virtually all of the hereinabove mentioned disadvantages of prior art oil separation methods and/or devices are completely eliminated in the present invention. For example, no separating apparatus or device of the hereinabove mentioned prior art type is required when the system of the present invention is employed in conjunction with a citrus fruit juice extraction machine of the above mentioned prior art type. The oil is received separately from the great bulk of the citrus fruit juice and never becomes intermingled therewith and so does not require any subsequent separation. I have found through experiments that at least 75% of the expressed citrus fruit peeling oil will be received by my relatively oily juice receiving compartments and will never become intermingled with the relatively oil free, high standard portion of the expressed juice, which is received by the middle compartment of the receiving pan. This arrangement is desirable for a number of reasons. First and foremost, it greatly increases the quantity of high standard citrus fruit juices produced from any given quantity of citrus fruit, and consequently greatly reduces the quantity of relatively oily citrus fruit juice which must be used for other purposes. This has the effect of increasing the capacity of any given fruit juice extraction machine, or of any plant having a given number of such machines, without requiring the installation of any additional equipment other than the relatively cheap receiving pan of the present invention. Therefore, this arrangement is both more efficient with respect to a given quantity of fruit and also more efficient with respect to a given number of extraction machines.

Furthermore, the arrangement of the present invention does not tend to increase oxidation or enzymatic action in the manner of the hereinabove mentioned prior art separating devices. Thus flavor, aroma, and health giving, vitamin potency are retained.

With the above points in mind, it is an object of the present invention to provide a novel, compartmentalized, receiving pan means adapted for cooperation with a juice extraction machine in a manner whereby certain constituents or components (such as peeling oil and the like) are substantially separately received and isolated from the remainder of the expressed juice.

Other and allied objects will be apparent to those skilled in the art after a careful perusal, examination, or study of the accompanying illustrations, the present specification, and the appended claims.

To facilitate understanding, reference will be made to the hereinbelow described drawings, in which.

Figures 1, 2:
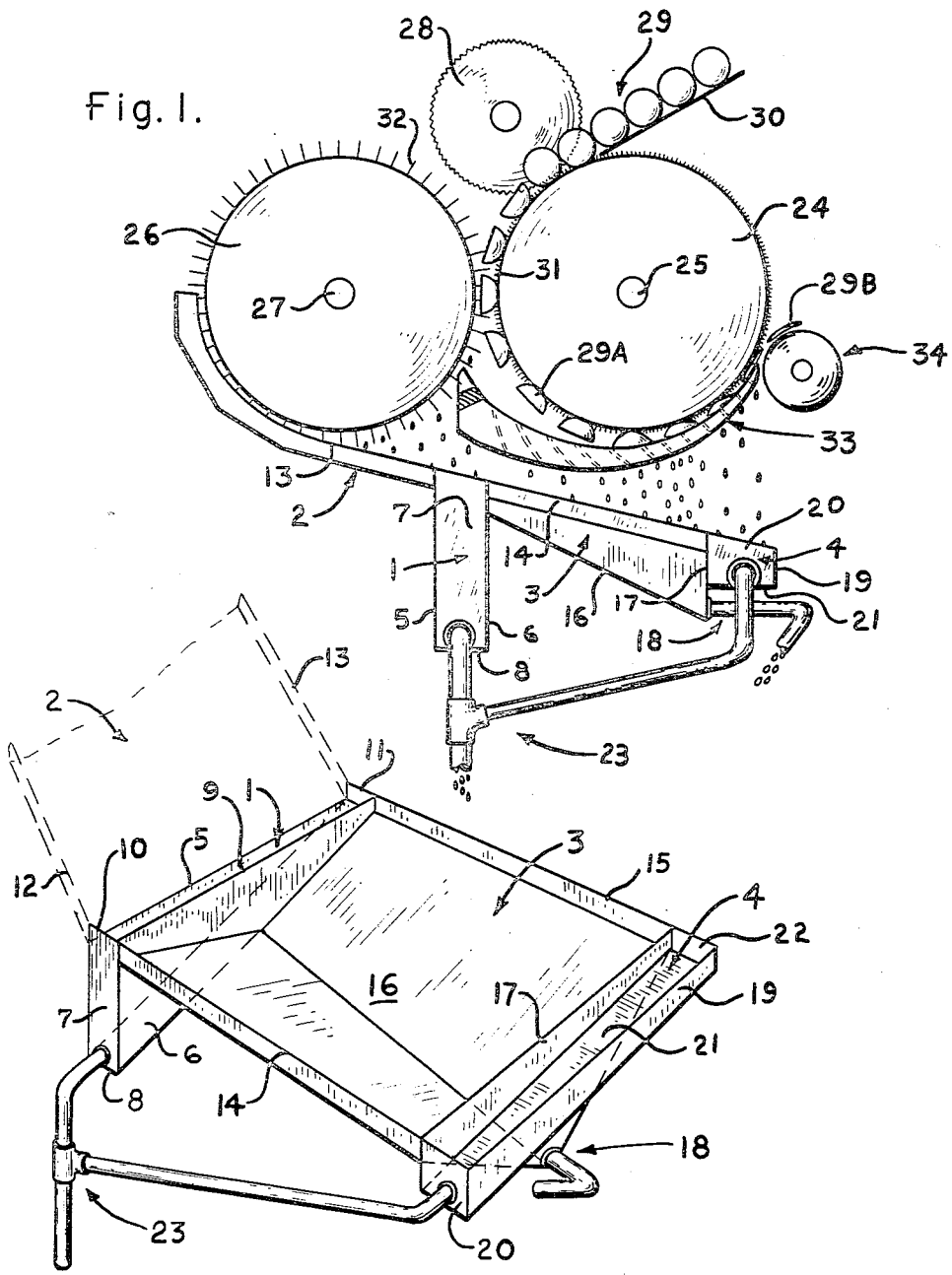
Fig. 1 is a fragmentary elevation of one illustrative embodiment of the present invention in cooperative relationship with respect to one prior art type of citrus fruit juice extraction machine (portions of which are removed for clarity).
Fig. 2 is a perspective view of the compartmentalized receiving pan shown in side elevation in Fig. 1.

Generally speaking, the present invention includes divided, compartmentalized receiving pan means adapted to be arranged below the juice expressing region of a fruit juice extraction machine with at least one compartment being positioned with respect to the region where the fruit juice extraction machine damages the fruit peeling so as to receive virtually all of the juice containing more than a preselected percentage of undesirable fruit peeling oil and liquid, and with at least one of said compartments being so positioned with respect to the juice expressing region and the region (or regions) where the juice extraction machine damages the fruit peeling so as to receive virtually all of the expressed juice having less than a preselected percentage of undesirable peeling oils and liquids therein.

In the specific example described and illustrated, the compartmentalized receiving pan means includes a front or first compartment, indicated generally at 1 (to which is connected a curved back pan portion indicated generally at 2), a second or middle compartment indicated generally at 3, and a third or rear compartment indicated generally at 4.

In the specific example described and illustrated the receiving pan and portions 1, 2, 3, and 4 thereof are made of stainless steel formed in a manner whereby the front pan 1 is defined by two upstanding side walls 5 and 6 and an upstanding end wall 7 at right angles to the side walls 5 and 6, and an angularly inclined bottom wall 8 which slopes downwardly from the far side of the pan to the near side 5 thereof, as viewed in Fig. 1. It should be noted that the top edge of the wall 6 is provided with an upstanding edge or lip 9 which acts to effectively divide the compartment 1 from the compartment 3, that wall 7 is provided with a similar upstanding lip 10 at right angles to the lip 9, and that the opposite end or far end of the bottom 8 of the compartment 1 is similarly provided with an upstanding lip 11. The purpose of the lips 10 and 11 being to separate the top surface of the interior of the compartment 9 from the exterior thereof. It should also be noted that the upper edge of the wall 5 of the compartment 1 is adapted to cooperate with and receive the forward edge of the rear pan 2 (which is also provided with lateral upstanding lips 12 and 13) whereby expressed juice and/or oil will flow from the upwardly curved portion 2 into the upper compartment 1. In the specific example described and illustrated, the second or middle compartment 3 is defined by upstanding lip like edge walls 14 and 15 (which are merely extensions of the similar lips 10 and 11 of compartment 1) carried at the outer edges of a V-shaped bottom member 16. The left hand end of the second or middle pan 3 is defined by the outer or right hand side of the upstanding wall 6 of the first or front compartment 1. The right hand end of the second or middle pan 3 is defined by a similar upstanding wall 17 which also acts as the left hand wall of the third or rear compartment 4. It should be noted that the V-shaped bottom 16 of the second or middle pan 3 is deeper at the right hand end thereof than at the left hand end thereof and that outlet conduit means indicated generally at 18 is positioned at the apex of the V, which is the lowest point in the middle pan 3. In the specific example described and illustrated, the third or rear pan 4 is defined by the left hand upstanding wall 17, a similar laterally spaced right hand wall 19 and an end wall 20 at the near or front end of the compartment 4 (as viewed in the figures) at right angles to the side walls 17 and 19. Also provided, is a bottom member 21 connected across the side walls 17 and 19 and the end wall 20 and angularly inclined downwardly from the far side thereof toward the near side thereof as viewed in the figures. The far side of the bottom 21 is provided with an upwardly directed lip like portion 22 which is merely an extension of the lip like edge portions 11 and 15 of the first compartment 1 and second compartment 3.

The near ends 7 and 20 of the first and third compartments 1 and 4 are provided with connected outlet conduit means 23.

Also, generally speaking, the receiving pan of the present invention is adapted to be placed beneath a juice extraction machine in a manner whereby at least one of the compartments will be positioned to receive relatively oily juices and whereby at least one other separate compartment will be positioned to receive relatively non-oily juice.

In the specific example described and illustrated, the fruit juice extraction machine (which is only partially shown for clarity) comprises a front drum pivotally mounted as indicated at 25, and a back drum 26 pivotally mounted as indicated at 27 so as to be in virtually parallel and closely laterally spaced with respect to the first drum 24. It is to be understood, of course, that the drums 24 and 26 are adapted to be simultaneously driven with the drum 24 rotating in counterclockwise direction around the axis 25 and the drum 26 about the axis 27 in clockwise direction. The driving means is not shown since it is not essential for an understanding of the invention.

Also provided is driven fruit saw means 28 (so positioned as to receive fruit indicated generally at 29 fed thereinto by suitable feeding means indicated diagrammatically at 30) and adapted to sever the fruit and allow the severed portions to be impaled by the impaling pins 31 carried by the drum 24 and the impaling pins 32 carried by the drum 26. This will cause severed portions of fruit 29A to be drawn downwardly and brought into forcible contact with a spirally radially inwardly curved, perforated, pressure plate or grid indicated generally at 33.

Also provided is a separator roller, indicated generally at 34, which is adapted to remove the fruit pulp, such as is indicated at 29B, after the extraction or expressing operation is completed.

The operation of the device may be very simply described as follows. The fruit 29 is fed along the inclined trough 30 to the saw 28 where it is severed and is then impaled and drawn by the impaling teeth or pins downwardly into ever increasing pressurized contact with the perforated pressure plate 33. The great majority of the good of the relatively oil free fruit juice will be extracted in the portion beginning with the left hand end of the pressure plate or grid 33 and ending a short distance from the right hand end of the pressure plate or grid 33. This is because in said region virtually no damage is done to the fruit peel and therefore very little oil is expressed.

However, when the fruit is first severed by the saw 28 and is first impaled by the pins 31 and 32, considerable damage is done to the fruit peel and a substantial amount of oil leaves the fruit and is thrown by the saw 28, primarily onto the back drum 26 and is carried thereby in clockwise direction around the axis 27. During the clockwise rotation, said oil will usually drop into the extended, upwardly curved, receiving pan portion 2 (which is connected to the pan compartment 1). Therefore, virtually all of said oil (and a small amount of fruit juice) will be fed directly into the receiving compartment 1 of the receiving pan, which is properly positioned for this purpose.

The relatively oil free juice, which is expressed in the central portion of the juice extraction zone, will drop directly into the middle or second compartment 3 of the receiving pan means and will flow outwardly through the high standard juice outlet conduit 18 to a selected zone for further processing such as vacuum concentrating, freezing and the like.

In the right hand end of the juice expressing region adjacent the right hand end of the pressure plate or grid 33, the clearance between the pressure plate or grid 33 and the opposed surface of the drum 24 becomes so slight that the peeling or skin of the fruit is likely to be torn, crushed, or otherwise injured thus expressing considerable oil which will drop into the third or rear compartment 4 and from whence it will flow to and be combined with similar outflowing relatively oily juice in the combined outlet conduit means 23 which can be connected to any selected region where the oily juice can be further processed to produce by-products of various kinds.

In order to clarify the position of the two oily extraction zones and the one non-oily extraction zone in the specific arrangement illustrated in Fig. 1, the relatively oily drops of juice are illustrated in solid black and the relatively non-oily drops of extracted juice are illustrated in black outline.

Numerous modifications and variations of the present invention will occur to those skilled in the art after a careful study hereof. All such properly within the spirit and teachings of the present invention are intended to be included and comprehended as fully as if specifically described, illustrated, and claimed herein.

For example, while I have described and illustrated the receiving pan of the present invention in cooperation with a specific prior art type citrus fruit juice extraction machine, I do not limit the present invention to an arrangement adapted to cooperate with only said prior art type of juice extraction machine, but contemplate cooperative relationship of a receiving pan, constructed in accordance with the principles of the present invention with respect to any type of juice extraction machine wherein certain components are selectively preponderantly extracted in certain phases of the extraction cycle and wherein it is desirable to separate said components from the remainder of the extracted juice. With this thought in mind it should be apparent that the present invention is not limited to the specific structural arrangement described and illustrated herein, but may assume any form pursuant to the principles taught herein. It should also be noted that in many applications of the present invention it will not be necessary or desirable to divide the oily juice receiving compartments into separate sections as specifically described and illustrated herein. It should also be noted that the V-shaped arrangement of the middle pan and the inclined arrangements of the other two pans may be modified substantially within the scope hereof. Various other types of materials resistant or virtually impervious to attack by the extracted juices may also be employed.

The exact configuration, structure, positional relationship and composition of the various component parts of the present invention may be varied within wide limits.

The embodiments of the present invention described and illustrated herein are exemplary only, and are not intended to limit the scope hereof, which is to be interpreted in the light of the prior art and the appended claims only, with due consideration for the doctrine of equivalents.

I claim:

1. An extracted juice receiving pan for receiving juices from three separate portions of a juice expressing machine comprising: a three division, three compartment receiving pan means cooperable with the citrus fruit juice expressing machine in receiving position below the juice expressing region of the citrus fruit juice expressing machine, said receiving pan means including a front compartment, a middle compartment and a rear compartment physically relatively positioned with respect to each other and with respect to the citrus fruit juice expressing machine when in cooperative relation with respect thereto whereby said front compartment of said receiving pan means will be cooperatively positioned to receive virtually all of the citrus fruit peeling oil produced from a front zone as a result of the severing and impaling of the citrus fruit peeling, and whereby said middle compartment will be cooperably positioned to receive expressed citrus fruit juice from a middle zone and having less than a preselected percentage of citrus fruit peeling oils and liquids therein, and whereby said rear compartment of said receiving pan means will be cooperatively positioned to receive citrus fruit peeling oil and liquids expressed from the citrus fruit peelings in a rear zone of greatest compression and damage thereto; said front and rear compartments being provided with outlet conduit means cooperable therewith to drain off the citrus fruit juice from the front and rear zones and containing citrus fruit peeling oil and liquids in excess of a preselected percentage; said middle compartment being provided with a separate outlet conduit means cooperable therewith to drain off the expressed citrus fruit juice from the middle zone and having less than a preselected percentage of undesirable citrus fruit peeling oils and liquids therein.

2. A device of the character defined in claim 1 including common outlet conduit means effectively connected to the outlet conduit means connected to the front compartment and to the outlet conduit means connected to the rear compartment and cooperable therewtih to drain off all citrus fruit juice containing citrus fruit peeling oil and liquids, the said peel oil approximating 75 percent of the total expressed peel oil and to do so in a manner completely separate from the outlet conduit means connected to the middle compartment.

References Cited in the file of this patent
UNITED STATES PATENTS

| | | |
|---|---|---|
| 23,238 | Emerson | Mar. 15, 1859 |
| 806,991 | Oliver | Dec. 12, 1905 |
| 1,748,789 | Orkin | Feb. 25, 1930 |
| 1,789,444 | Mathewson | Jan. 20, 1931 |
| 1,879,269 | Hutchinson | Sept. 27, 1932 |
| 1,971,546 | Tuttle | Aug. 28, 1934 |
| 2,212,066 | Fry | Aug. 20, 1940 |
| 2,350,603 | Fry | June 6, 1944 |
| 2,420,679 | Pipkin | May 20, 1947 |
| 2,574,922 | Karp et al. | Nov. 13, 1951 |